PAPER MACHINERY

Original Filed March 29, 1965

INVENTOR.

MAURICE J. ANDERSON

BY

Marechal, Biebel, French & Bugg

ATTORNEYS

PAPER MACHINERY

Original Filed March 29, 1965

INVENTOR.

MAURICE J. ANDERSON

BY

Marechal, Biebel, French & Bugg

ATTORNEYS

INVENTOR.
MAURICE J. ANDERSON
BY
Marechal, Biebel, French & Bugg
ATTORNEYS

INVENTOR.

BY MAURICE J. ANDERSON

Marechal, Biebel, French & Bugg

ATTORNEYS

United States Patent Office

Re. 26,528
Reissued Feb. 11, 1969

26,528
PAPER MACHINERY

Maurice J. Anderson, Fulton, N.Y., assignor to The Black Clawson Company, Hamilton, Ohio, a corporation of Ohio Original No. 3,309,036, dated Mar. 14, 1967, Ser. No. 443,314, Mar. 29, 1965. Application for reissue May 29, 1967, Ser. No. 646,756
U.S. Cl. 242—58.3 14 Claims
Int. Cl. B65h *19/14*

Matter enclosed in heavy brackets [ ] appears in the original patent but forms no part of this reissue specification; matter printed in italics indicates the additions made by reissue.

*ABSTRACT OF THE DISCLOSURE*

*An apparatus for continuously unwinding and splicing web materials comprising a reel assembly for supporting a plurality of supply rolls and including web severing and splicing means. Roll speed up mechanisms are provided for bringing the speed of the reserve rolls up to that of the expiring web prior to the splicing operation. A pair of pressure rollers are resiliently urged against the new roll by pressure cylinder means acting on their common supporting arms so as to provide a resilient loading or cushioning effect during splicing operations irrespective of which roll is used.*

This invention relates to an improved apparatus for continuously unwinding and splicing web materials such as paper or plastic webs, and more particularly, to an improved apparatus which can splice selectively either side of an unwinding web from an unwinding or expiring roll to the lead end of the web from a new or full roll regardless of the extent of web material remaining on the unwinding roll and/or the new roll.

Due to the difference in surface finish on opposite sides of a web of material, such as a paper web, it is usually necessary to present a particular side of the web on top as it enters a succeding machine, as for example, a printing machine or other converting station. For this reason, a desirable feature for an unwinding and splicing apparatus is to provide for splicing selectively of either side of the unwinding web to the lead end of a new roll. Furthermore, for the greatest economy and most efficient use of the succeeding machine, it is desirable to provide for the web splice without stopping for rethreading or slowing down the speed of the unwinding web.

Another desirable feature for an unwinding and splicing apparatus is to provide for the replacement of a roll which has just begun to unwind when it is determined tht the web of material is undesirable, as for example, it is desired to change the grade of a paper web. To accomplish this, it is required that the unwinding web from a practically full roll be spliced to the lead end of a web from another full roll. Thus to combine this feature with the aforementioned feature of selectively splicing to either side of the unwinding web, the apparatus of the invention provides a reel for supporting a plurality of full rolls and enables the reel carrying the full rolls to be rotated in either direction through a full revolution. As an additional feature, this unrestricted movement of the reel enables the reel to be loaded with full rolls from a transfer table or a floor cart, regardless of the direction the reel must rotate to position the full roll for splicing.

It is also a desirable feature that the unwinding and splicing apparatus be adapted to handle a broad range of new incoming rolls from a full roll of a predetermined diameter to a new roll only slightly greater in diameter than the core. This feature permits the operator to use up a series of small rolls of varying diameters, as for example, when it is desired to build up a large roll on a winder apparatus from smaller rolls.

Accordingly, it is a primary object of the present invention to provide an improved unwinding and splicing apparatus for web materials whereby either side of an unwinding web from an expiring roll can be selectively spliced to the lead end of a web from a new roll without stopping for rethreading or slowing down the speed of the unwinding web.

tI is also an object of the invention to provide an improved unwinding and splicing apparatus as outlined above wherein the web from another full roll can be selectively spliced to the web from an unwinding roll immediately after the unwinding of the roll has begun and the roll is substantially full.

A further object of the invention is to provide an apparatus as outlined above wherein a pressure roll is positioned on each side of the unwinding web and may be selectively movable towards the new roll to provide pressure contact between either side of the unwinding web and the outer surface of the new roll for selectively splicing to either side of the web.

As another object, the invention provides an improved apparatus as described above including a reel having a pair of spaced apart guide or idler rolls between which a cut-off knife is operable to provide a quick, smooth and uniform servering of the web while it is held with uniform tension over the rolls.

Sill a further object is to provide an improved apparatus as outlined above including a mechanism for providing substantially uniform resilient loading of the web against the new roll during the splicing operation and also a mechanism for rapidly moving either side of the unwinding web against the surface of the full roll.

It is also an object of the invention to provide an unwinding and splicing apparatus employing a reel which can be loaded with full rolls at practically any elevation regardless of the direction the reel must be rotated for splicing the selected side of the unwinding web to the full roll.

Still aonther object is to provide an apparatus as outlined above, wherein the new roll to be spliced can vary in diameter from the size of a full roll to a roll only slightly greater in diameter than the core.

Other objects and advantages of the invention will be apparent from the following description, the accompanying drawings and the appended claims.

In the drawings—

Figure 4:
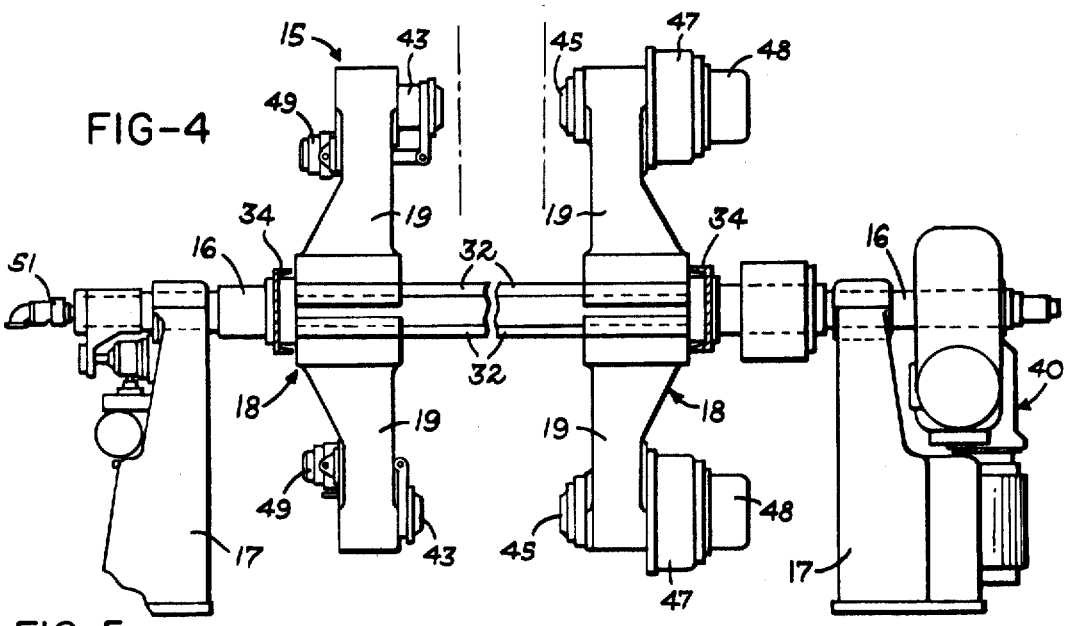
FIG. 4 is an elevational view of the reel support pedestals and the reel as seen along the line 4—4 of FIG. 1.

Referring to the drawings, which illustrate a preferred embodiment of the invention, the apparatus incorporates generally a reel 15 which is carried on a main shaft 16 extending betwen and rotatably supported by a pair of end pedestals 17 (FIG. 4). The reel 15 comprises a pair of end spiders 18 each including a pair of diametrically opposed arms 19 which support a fresh or new roll 20 and an expiring roll 22 from which an unwinding web W is fed into wrapping engagement with either the clockwise splicing on pressure roll 25 or the counterclockwise splicing on pressure roll 26. As shown in FIG. 4, the arms 19 are carried by the main shaft 16 and are axially slidable or adjustable on guideways 32 (FIG. 4) for accommodating rolls for different lengths.

Forming part of the reel end spiders 18 and extending at right angles to the arms 19 are diametrically opposed arms 34 each of which supports a pair of parallel spaced guide or idler rolls 35 extending parallel to the main shaft 16. The reel 15 is rotated or indexed in either direction by a reversible drive unit 40 connected to one end of the main shaft 16 and mounted on one of the end pedestals 17. The arms 19 on one end of the reel 15 carry pneumatically operated latch spindles 43 which are adapted to engage one end of the core of a roll. The opposite end of the core is rotatably supported by a spindle 45 mounted on the end of the arm 19 at the opposite end of the reel. Preferably, the spindles 45 are provided with suitable spindle brakes 47 and tachometers 48. In the usual manner, the latch spindles 43 are extended and retracted axially to engage a core by operation of the pneumatic pressure cylinders 49 which are connected by a suitable conduit (not shown) to a rotary union 51 which, in turn, is connected to a suitable fluid supply line and control system.

Figure 1:
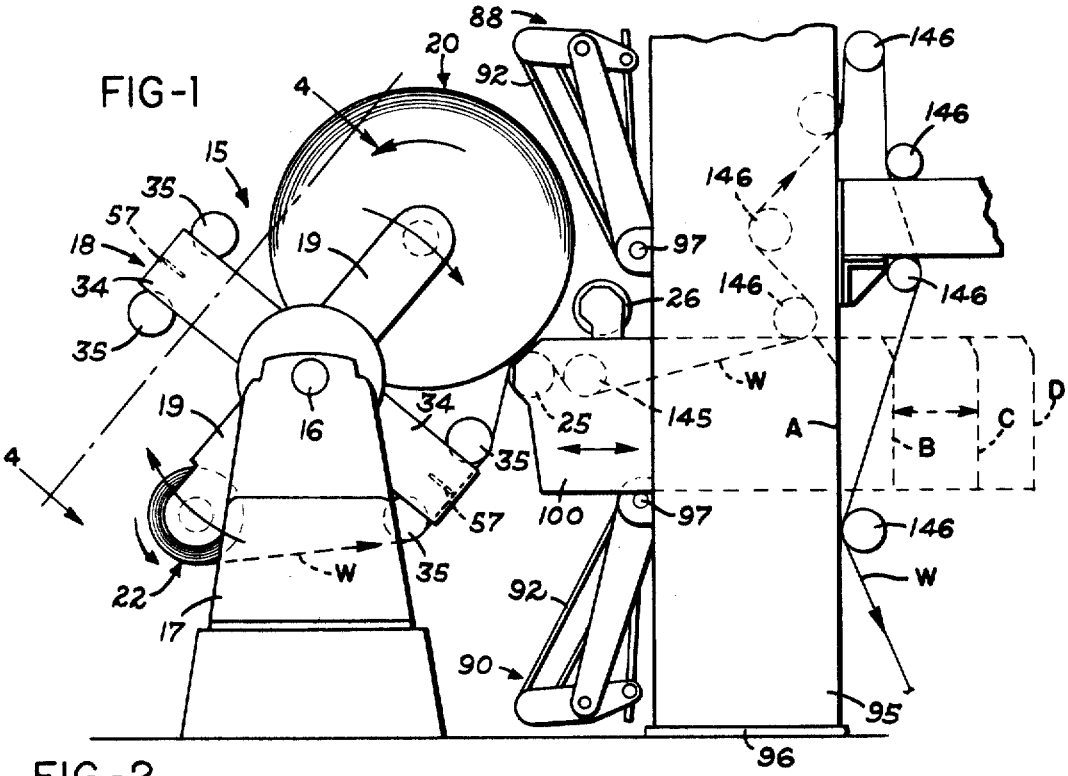
FIG. 1 is an elevational view showing generally the overall arrangement of the major components of apparatus according to the invention.
Figure 2:
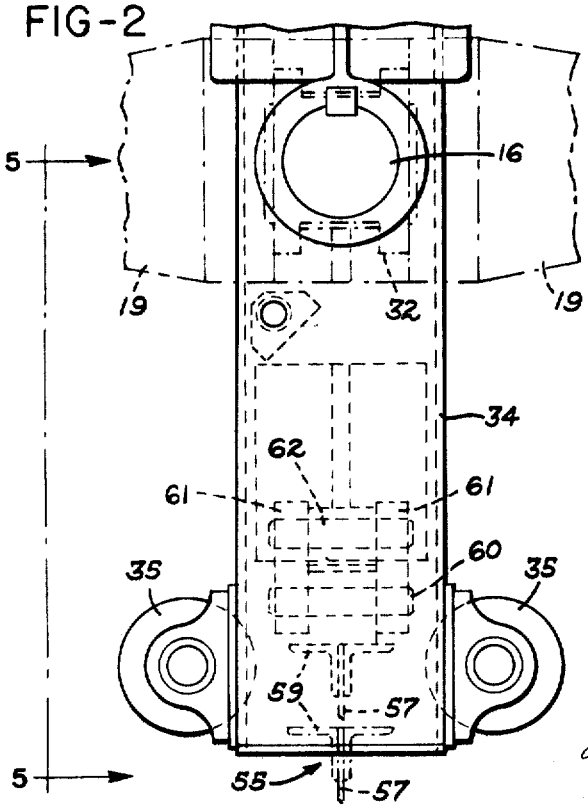
FIG. 2 is an enlarged view of one of the reel arms of FIG. 1 showing the generally radial movement of the cut-off knife spaced between a pair of guide rolls.

As the reel 15 is indexed or rotated by the drive unit 40, the unwinding web W is picked up by a pair of the parallel spaced guide rolls 35 so that the web is wrapped partially around each roll as shown in FIG. 1 and is at all times provided with a fixed path during cutting or severing. When the roll 22 of web material is nearly expired and it is desired to sever the web for splicing, a severing mechanism 55 (FIG. 2) located between each pair of guide rolls 35 is actuated. This mechanism includes generally a knife blade 57 having a slightly longitudinally tapered cutting edge and supported by a retaining member 59 which extends parallel to the main shaft 16. Pivotally connected to each end of the retaining member 59 by a pin 60 is an arm 61. The arms 61 are pivotally supported by the pins 62 carried by brackets 63 and 64 rigidly mounted on their respective arms 34.

Mounted on each of the arms 61 is a plate 68, and the radially inward ends of the plates 68 are pivotally connected by an axially extending adjustable tie rod member 70 so that the arms 61 can pivot together causing the blade 57 to move radially outwardly between the adjacent idler rolls 35 in a parallelogram motion. The severing mechanism 55 is actuated by an air pressure cylinder 72 (FIG. 5) having one end pivotally connected by a pin 73 to a bracket 74 extending from an arm 34. A piston rod 75 extends from the opposite end of the cylinder 72 and is pivotally connected to an arm 61 by a pin 77.

Figure 3:
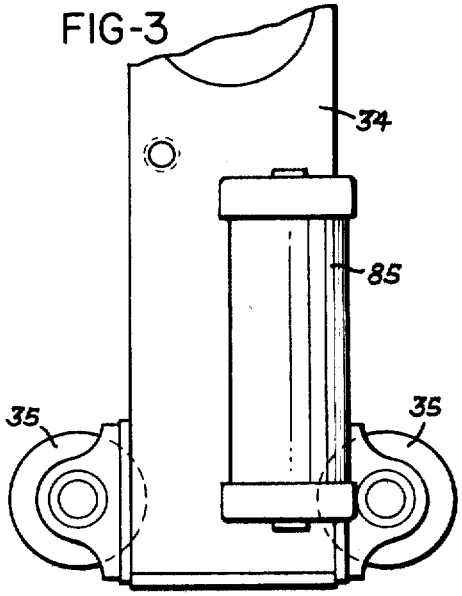
FIG. 3 is an enlarged detail view of another reel arm showing an air accumulator or purge tank mounted thereon.

Mounted on one of the plates 68 is an actuator member 80 which has a finger 81 adapted to operate a pair of limit switches 82 and 83 mounted on the bracket 63. These limit switches 82 and 83 serve to indicate whether the knife blade 57 is in its extended or retracted position in addition to preventing the reel from being indexed except when the blade 57 is retracted and also to give a signal at the end of the knife cutting stroke so that the control circuits for operating the splicing roll can be restored to their normal position and the knife blade retracted. To provide quick action of the pressure cylinder 72, an accumulator or purge tank 85 (FIG. 3) is carried by an arm 34 to provide the required volume of air at a substantially constant pressure.

When a new roll 20 is placed on the reel 15, the reel is indexed by the drive unit 40 (FIG. 4) until the outer surface of the new roll engages either the upper speed-up mechanism 88 (FIG. 1) or the lower speed-up mechanism 90, depending on which side of the web from the new roll is to be positioned on top. Each of these speed-up mechanisms is provided with an endless belt 92 which is driven by a suitable variable drive motor (not shown). The speed-up mechanisms are carried by a pair of parallel spaced end stands 95 extending vertically from the base 96. The speed-up mechanisms are pivotally supported by a shaft 97 so that either mechanism may be pivoted towards a new roll 20 by actuation of its corresponding pressure cylinder 98 (FIG. 6) until the belt 92 firmly engages the outer surface of the roll 20.

Figure 10:
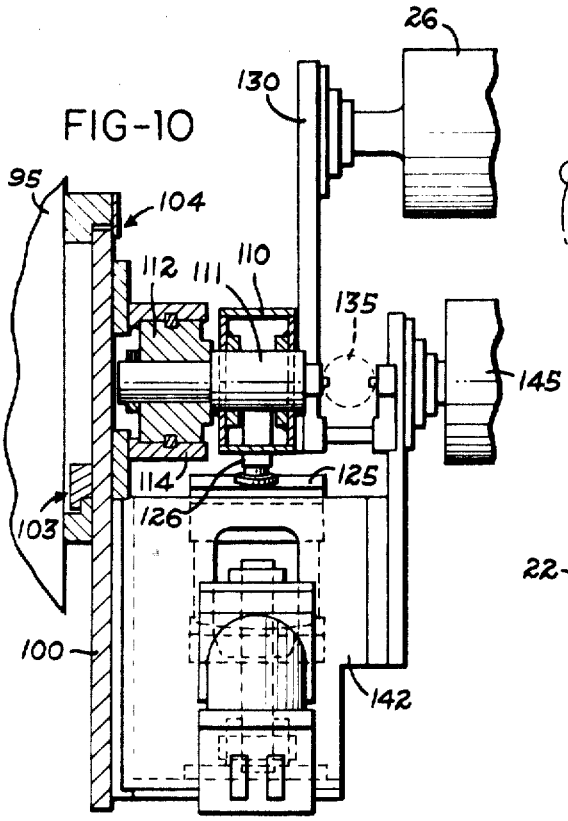
FIG. 10 is a section on the line 10—10 of FIG. 9.

As mentioned above, a pair of splicing or pressure rolls 25 and 26 are positioned with one on each side of the web W and are movably carried by a pair of end supports (FIG. 1). Each of the support members 100 is slidably mounted by a lower track system 103 (FIG. 10) and an upper track 104 on the adjacent end stand 95.

Figure 6:
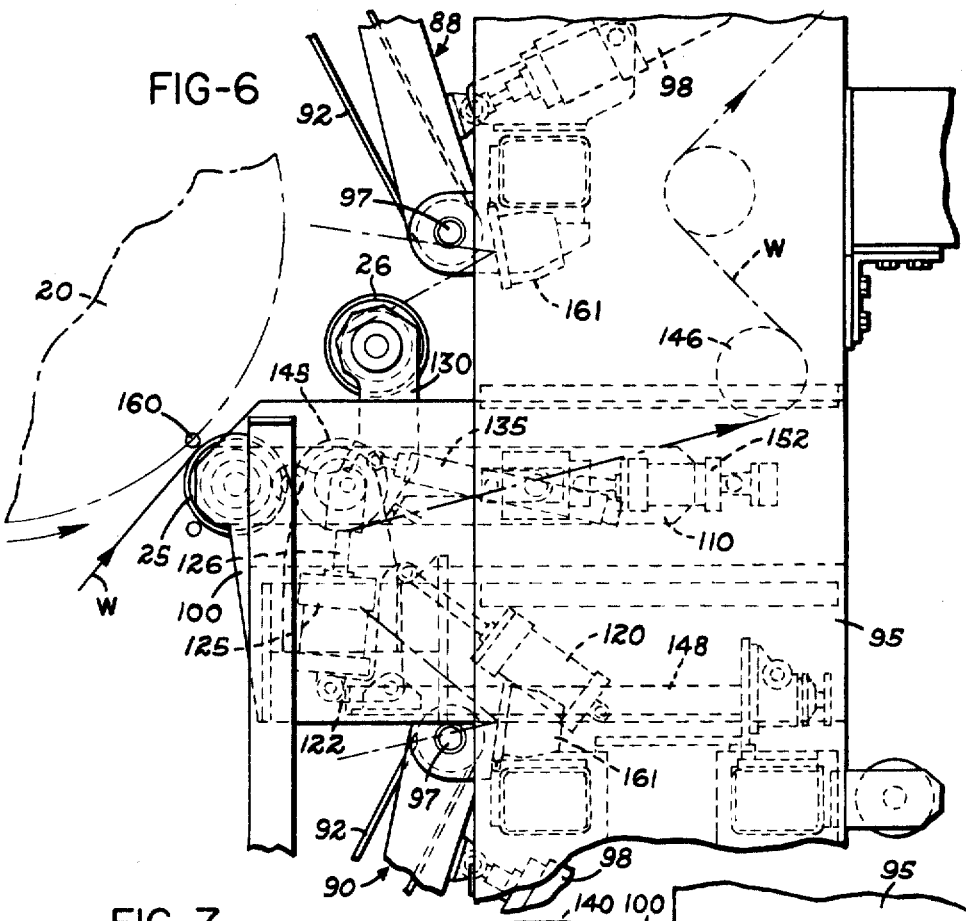
FIG. 6 is a detailed elevational view of the splicing or pressure rolls and the mechanism for moving and supporting them for counterclockwise unwinding of the new roll.

As shown in FIG. 6, the clockwise rotating splicing or pressure roll 25 is carried by the forward ends of a pair of horizontally extending arm 110. The rear portion of each arm 110 is pivotally mounted on a pin 111 (FIGS. 9 and 10) extending from a block 112 slidably mounted within the guideways 114 carried by the support member 100. Thus the arms 110 are adapted to slide horizontally relative to the support members 100, and as a result of the pin 111 extending through the slide block 112, the forward end portions are adapted to float slightly in a vertical plane. This slight floating movement of the arms 110 is controlled by a system including a pressure cylinder 120 (FIG. 6) which is connected to the arm 110 through a lever member 122 and a cushion pressure cylinder 125 having a piston rod 126 pivotally connected to the arm 110 by a pin 127 (FIG. 8).

Figure 7:
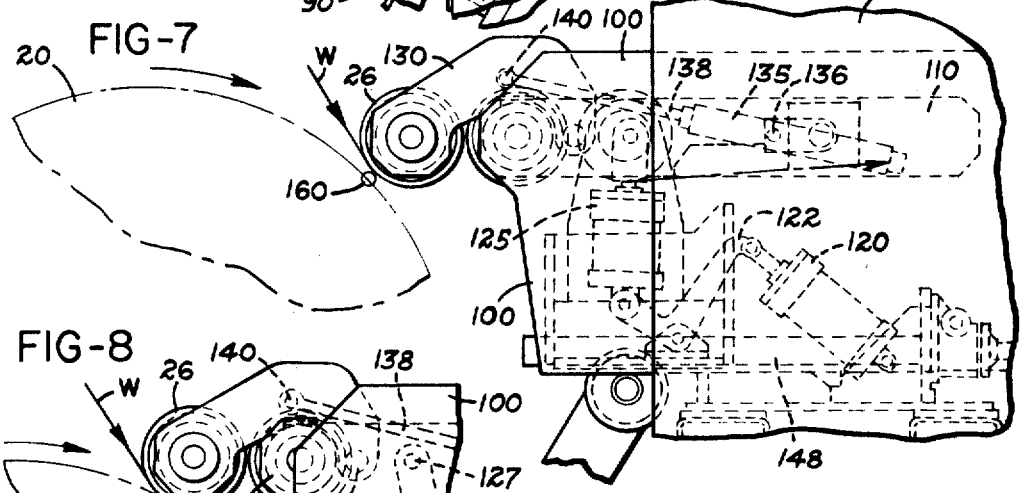
FIG. 7 is a view similar to FIG. 6 of the splicing rolls and mechanism showing their relative position for clockwise unwinding immediately before the splicing.
Figure 8:
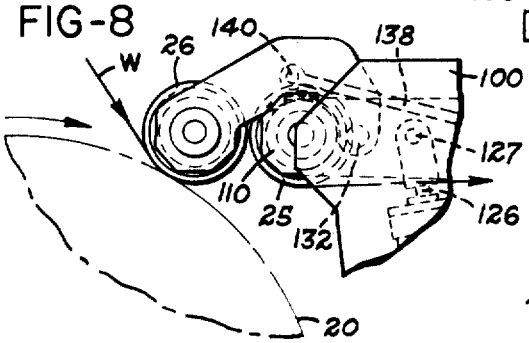
FIG. 8 is a view similar to FIG. 7 showing the pressure rolls as positioned during splicing of the new roll for clockwise unwinding.
Figure 9:
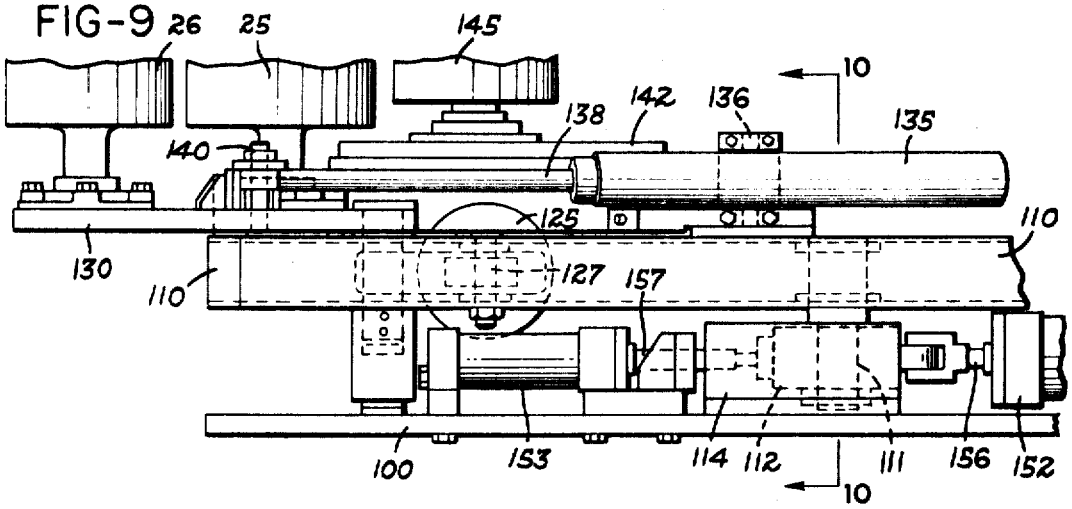
FIG. 9 is a plan view of the operating mechanism shown in FIGS. 6 and 7 located on one end of the splicing rolls.

The counterclockwise splicing or pressure roll 26 is also carried by the horizontal extending arms 110 through a pair of pivoting support arms 130 having ends connected to the arms 110 by the pins 132 (FIG. 8). The pressure roll 26 is movable between the retracted position shown in FIG. 6 and the advanced position of FIG. 7 by the actuation of elongated pressure cylinders 135 pivotally mounted on the arms 110 by pins 136 (FIGS. 7 and 9). The piston rods 138 extending from the cylinders 135 are connected to the arms 130 by pins 140 (FIG. 8). Also carried by the support members through a frame 142 (FIG. 10) is a wrapping or guide roll 145, which directs the web around the pressure roll 25 so that it has substantially the same wrap or partial envelopment at all times. The web W then travels from the roll 145 around the guide rolls 146 and on to the succeeding machine such as a printing or other converting station (not shown).

The horizontal positioning of the support members 100, for example, to stations A, B, C and D (FIG. 1) is controlled by a pair of screw jacks 148 (FIG. 6) driven by a suitable reversible motor (not shown). The horizontal movement of the arms 110 is controlled by a pair of opposed pressure cylinders 152 and 153 which are mounted on the support member 100 (FIG. 9) and include piston rods 156 and 157 respectively, connected to the ends of the slide block 112. Thus it can be seen that by extending the support members 100, the splicing rolls can be positioned close to the main shift 16 within the swing circle of the cores when it is desired to splice a new roll having a relative small diameter.

Figure 11:
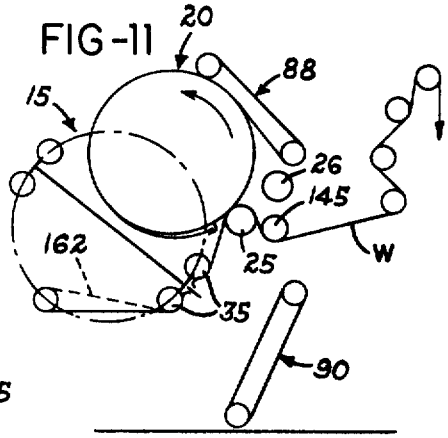
FIG. 11 is a schematic view of the apparatus shown in FIG. 1 showing the general arrangement when the unwinding web from the expiring roll and the web from the new roll are spliced with the inside surface on top.

In operation, when the inside surface of an unwinding web W is positioned on top, as shown in FIG. 11, and it is desired to splice the lead end from a new roll so that the inside surface of its web is also on top, the reel is indexed clockwise until the new roll 20 is generally in the position as shown in FIG. 6 where the upper photoelectric cell 160 is employed to stop the indexing when the roll 20 is 1" away from the splicing roll 25. This causes the unwinding web W to be directed over the lower pair of idler rolls 35 and the new roll 20 to be positioned adjacent the upper speed-up mechanism 88.

This mechanism 88 is then lowered until contact is made with the new roll 20 (FIG. 11) by operation of the corresponding pressure cylinder 98 so that the new roll is provided with a peripheral speed substantially the same as the unwinding web speed. By the use of the upper photoelectric cell 161 (FIG. 6), the roll 20 is scanned for the leading edge and in response thereto initiates the splicing sequence including the actuation of the pressure cylinder 152 causing the pressure roll 25 to be moved rapidly towards the new roll 20 and thereby cause the top surface of the web W to engage the outer surface of the new roll 20.

Figure 5:
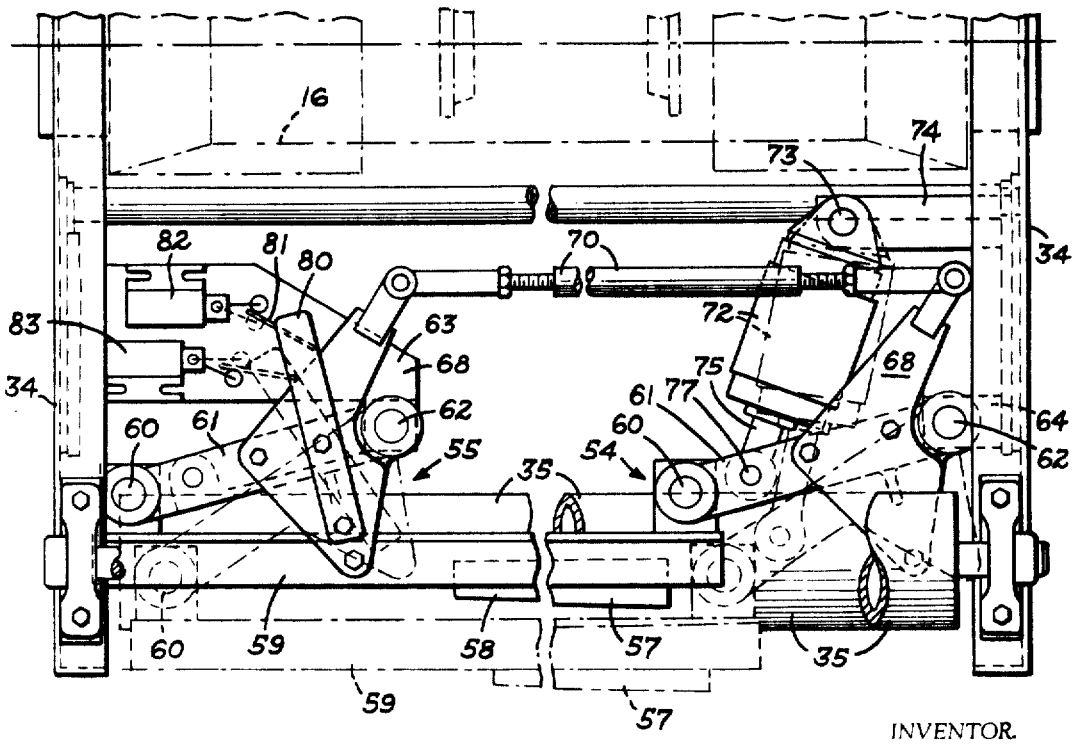
FIG. 5 is a view of the roll support reel showing the web cut-off mechanism as seen along the line 5—5 of FIG. 2.

Substantially simultaneously with the actuation of the pressure cylinders 152, the unwinding web W is severed by the actuation of the pressure cylinders 72 (FIG. 5). To provide a resilient loading of the pressure cylinder 25 against the new roll 20 during the splicing operation, the pressure cylinder 120 is previously actuated until the crank member 122 is in the position as shown in FIG. 6 and the piston rod 126 of the pressure cylinder 125 is extended. If the pressure cylinder 125 is provided with a substantially constant pressure, it can be seen that the forward ends of the arms 110 are floating under a biased constant upward force so that the contact force between the pressure roll 25 and the new roll 20 remains substantially constant throughout the splicing operation.

In a manner well known in the art, the lead end of the web from the new roll 20 is transferred to the trailing end portion of the unwinding web W, as for example, by a suitable perforated pressure sensitive transfer tape. After the splice is completed, the pressure roll 25 is retracted slightly by operation of the pressure cylinders 152 and 153. As shown in FIG. 11, the same operation as described above is performed when it is desired to reverse the surfaces of the web so that the lead end of the web from the new roll 20 is spliced to the outside surface of the unwinding web, in which case the unwinding web would be fed from the expiring roll 22 as shown by the dotted line 162.

Figure 12:
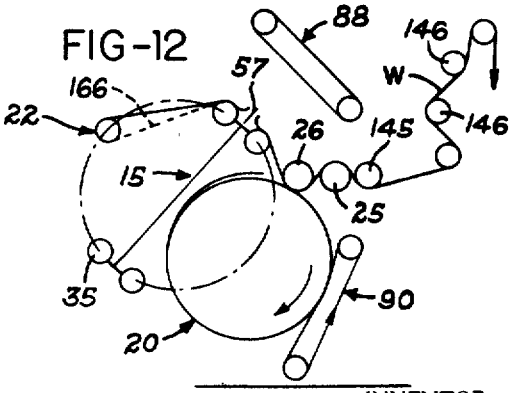
FIG. 12 is a schematic view similar to FIG. 11 when both of the webs are spliced with the outside surface on top.

Referring to FIG. 12, when it is desired to splice the lead end of the web from the new roll 20 to the continuously moving unwinding web W so that the outside surface of both webs are positioned on top, the reel 15 is indexed counterclockwise whereby the unwinding web is directed over the upper pair of guide rolls 35 and the new roll 20 is positioned adjacent the bottom speed-up mechanism 90. The peripheral speed of the new roll 20 is then brought up to substantially the web speed. The support members 100 are retracted into the end stands 95 by operation of the screw jacks 148, and the counterclockwise pressure roll 26 is revolved down into the position shown in FIG. 7 by actuation of the pressure cylinders 135. As can be seen, at this point the pressure roll 26 is not pressing against the outside surface of the new roll 20 but is spaced therefrom by a slight amount.

The piston rod of the pressure cylinder 120 (FIG. 7) is then retracted causing the cushion pressure cylinder 125 to move upwardly and its corresponding piston rod to be retracted. Upon receiving the signal from the lower photoelectric cell 161, the pressure roll 26 is moved rapidly against the outside surface of the new roll 20 by the actuation of the pressure cylinder 152. The unwinding web is then severed between the idler rolls 35, and the splice of the training end portion of the unwinding web is made to the leading end of the new web.

Since the force on the pressure roll 26 by the roll 20 is in a generally upward direction during this splicing operation, it can be seen that the retracted piston rod 126 of the pressure cylinder 125 provides a resilient downward loading for the pressure roll 26 and will permit the pressure roll to move upwardly if necessary for maintaining a constant pressure against the new roll 20.

When it is desired to reverse the position of the web so that the outside surface of the web from the new roll 20 is spliced to the inside surface of the unwinding web W, the same operation is used as described above for when both outside surfaces are positioned on top with the exception that the unwinding web is fed from the expiring roll 22 along a path indicated by the dotted line 166 (FIG. 12).

From the drawings and the above description, it can be seen that the unwinding and splicing apparatus of the present invention provides several significant advantages and desirable features. In general, the apparatus enables the leading end of the web from a new roll of any size to be spliced selectively to either side of the unwinding web from an expiring roll while maintaining the continuous high speed unwinding. In general, this feature is provided by the pair of diametrically opposed severing mechanisms 55 carried by the reel 15 in combination with a splicing or pressure roll spaced on each side of the unwinding web whereby each pressure roll is mounted for selective movement toward the center shaft 16 of the reel 15.

Furthermore, with the pressure rolls mounted so that they can be completely retracted by moving the support members 100 to station D (FIG. 1), full clearance is provided for a new roll 20 whereby the reel 15 can be indexed either clockwise or counterclockwise through a full revolution carrying with it both a new roll 20 and an expiring roll 22. This feature enables a new roll to be rejected and replaced by another new roll immediately after a splice has been made and it is determined that the web from the first new roll is undesirable.

In addition, this feature of providing full rotation of the reel 15 while carrying a substantially full unwinding roll, by retracting the pressure rolls 25 and 26, enables a new roll to be received directly from a transfer table or floor cart at any elevation by properly positioning the reel 15 regardless of whether the new roll must be carried by the reel to the position shown in FIG. 11 for presenting the inside surface of the web on top or to the position of FIG. 12 where the outside surface is presented on top. Thus by retracting the pressure rolls 25 and 26, a substantially full unwinding roll can be moved or revolved past the pressure rolls 25 and 26 so that another new roll can be loaded on the reel at a level below the reel axis, even though the new roll must be later revolved to the upper position of FIG. 11 for splicing and the unwinding roll must return back past the pressure rolls.

Another feature of the apparatus according to the invention is the resilient supporting of the horizontal extending arms 110 through the cushion cylinder 125 and actuating pressure cylinder 120 connected by the lever 122. As can be seen from the above description, proper actuation of this mechanism provides a resilient loading or cushioning during splicing regardless of which pressure roll 25 or 26 is used.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. An improved apparatus for continuously unwinding and splicing web materials wherein either side of the web from an unwinding roll can be sliced selectively to the lead end of a web from the new roll regardless of the extent of web material remaining on the unwinding roll, comprising a reel including means for supporting a plurality of rolls of web materials, web severing means on said reel, speed-up means for rotating the new roll until its peripheral speed is substantially the same as the unwinding web speed, a pressure roll positioned on each side of the unwinding web, means for selectively moving each of said pressure rolls generally toward said supporting means from a retracted position to provide pressure contact selectively between either side of the unwinding web and the outside web surface of the new roll according to whichever side of the web from the new roll is desired to be positioned on top, and means for actuating said severing means in timed relationship with the contact between the new roll and the unwinding web to effect cut-off and splicing of the web with the end of the new roll.

2. An improved apparatus for continuously unwinding and splicing web materials wherein either side of the web from unwinding roll can be spliced selectively to the lead end of the web from the new roll regardless of the extent of web material remaining on the unwinding roll, comprising a reel for supporting a plurality of rolls of web materials, web severing means carried by said rell, speed-up means for rotating the new roll until its peripheral speed is substantially the same as the unwinding web speed, a pressure roll positioned on each side of the unwinding web, means mounting said pressure rolls for horizontal movement as a unit to provide clearance for unrestricted movement of a new roll carried by said reel, means for selectively positioning each of said pressure rolls in the path of movement of a new roll to provide pressure contact selectively between either side of the unwinding web and the outside web surface of the new roll according to whichever side of the web from the new roll is desired to be positioned on top, and means for actuating said severing means in timed relationship with the contact between the new roll and the unwinding web to effect cut-off and splicing of the web with the end of the new roll.

3. An improved apparatus for continuously unwinding and splicing web materials wherein either side of the web from an unwinding roll can be spliced selectively to the lead end of the web from the new roll regardless of the extent of web material remaining on the unwinding roll, comprising a reel for supporting at least two rolls of web materials, a pair of parallel spaced guide rolls mounted on said reel, a web severing mechanism carried by said reel and operable between said guide rolls, speed-up means for rotating the new roll until its peripheral speed is substantially the same as the unwinding web speed, reversible drive means for rotating said reel, a pressure roll positioned on each side of the unwinding web, means mounting said pressure rolls for horizontal movement as a unit to provide clearance for unrestricted movement of a new roll carried by said reel, means for selectively positioning each of said pressure rolls in the path of movement of a new roll to provide pressure contact selectively between either side of the unwinding web and the outside web surface of the new roll according to whichever side of the web from the new roll is desired to be positioned on top, and means for actuating said severing mechanism in timed relationship with the contact between the new roll and the unwinding web to effect cut-off and splicing of the web with the end of the new roll.

4. An improved apparatus for continuously unwinding and splicing web materials wherein either side of the web from an unwinding roll can be spliced selectively to the lead end of the web from the new roll regardless of the extent of web material remaining on the unwinding roll, comprising a reel adapted to support a plurality of rolls of web materials, means rotatably supporting said reel so that each roll can be revolved about the axis of said reel, means on said reel for rotatably supporting each roll, at least two web severing means carried by said reel, speed-up means for rotating the new roll until its peripheral speed is substantially the same as the unwinding web speed, a pressure roll positioned on each side of the unwinding web, means for selectively moving each of said pressure rolls generally toward the reel axis from a retracted position to provide pressure contact selectively between either side of the unwinding web and the outside web surface of the new roll supported by said reel according to whichever side of the web from the new roll is desired to be positioned on top, and means for actuating one of said severing means in timed relationship wth the contact between the new roll and the unwnding web to effect cut-off and splicing of the web with the end of the new roll.

5. An improved apparatus for continuously unwinding and splicing web materials wherein either side of the web from an unwinding roll can be spliced selectively to the lead end of the web from the new roll regardless of the extent of web material remaining on the unwinding roll, comprising a reel for supporting a plurality of rolls of web materials, web severing means carried by said reel, speed-up means for rotating the new roll until its peripheral speed is substantially the same as the unwinding web speed, a pressure roll positioned on each side of the unwinding web, horizontally movable support means carrying said pressure rolls for movement from a retracted position to provide clearance for the movement of substantially full rolls when said reel is rotated to an extended position for splicing, means for moving one of said pressure rolls in relation to the other thereof generally toward said reel to provide pressure contact selectively between either side of the unwinding web and the outside web surface of the new roll according to whichever side of the web from the new roll is desired to be positioned on top, means for quickly moving the selected said pressure roll towards the new roll of web material, and means for actuating said severing means in timed relationship with the quick movement of the pressure roll against the new roll to effect cut-off and splicing of the web with the end of the new roll.

6. An improved apparatus for continuously unwinding and splicing web materials wherein either side of the web from an unwinding roll can be spliced selectively to the lead end of the web from the new roll regardless of the extent of web material remaining on the unwinding roll, comprising a reel adapted to support at least two rolls of web materials, adjustable means on said reel for accommodating rolls of different lengths, means for rotatably supporting said reel so that each roll can be revolved about the axis of said reel, means on said reel for rotatably supporting each roll, at least two web severing mechanisms carried by said reel and adapted to move about the reel axis with said rolls, speed-up means for rotating the new roll until is peripheral speed is substantially the same as the unwinding web speed, a pressure roll positioned on each side of the unwinding web, means for selectively moving each of said pressure rolls generally toward the reel axis from a retracted position to provide pressure contact selectively between either side of the unwinding web and the outside web surface of the new roll supported by said reel according to whichever side of the web from the new roll is desired to be positioned on top, and means for actuating one of said severing mechanisms in timed relationship with the contact between the new roll and the unwinding web to effect cut-off and splicing of the web with the end of the new roll.

7. An improved apparatus for continuously unwinding and splicing web materials wherein either side of the web from an unwinding roll can be spliced selectively to the lead end of the web from the new roll regardless of the extent of web material remaining on the unwinding roll, comprising a reel adapted to support a pair of diametrically positioned rolls of web materials, means for rotatably supporting said reel so that each roll can be completely revolved about the axis of said reel, drive means for rotating said reel, means on said reel for rotatably supporting and braking each roll, a pair of web severing mechanisms carried by said reel and positioned diametrically opposite and at right angles with said rolls, a pair of speed-up drive mechanisms adapted for selectively rotating the new roll in either direction until its peripheral speed is substantially the same as the unwinding web speed, a pressure roll positioned on each side of the unwinding web, means mounting each said pressure roll for movement from a retracted position where the pressure rolls provide clearance for the revolving of a new roll carried by said reel to an advanced position for providing pressure contact selectively between either side of the unwinding web and the outside web surface of the new roll supported by said reel according to whichever side of the web from the new roll is desired to be positioned on top, power operated means for moving each said pressure roll between said retracted and advanced positions, and means for actuating one of said severing mechanisms in timed relationship with the contact between the new roll and the unwinding web to effect cut-off and splicing of the web with the end of the new roll.

8. An improved apparatus for continuously unwinding and splicing web materials wherein either side of the web from an unwinding roll can be spliced selectively to the lead end of the web from the new roll regardless of the extent of web material remaining on the unwinding roll, comprising a reel adapted to support a pair of diametrically positioned rolls of web materials, means for rotatably supporting said reel so that each roll can be completely revolved about the axis of said reel, reversible power drive means for rotating said reel, means on said reel for rotatably supporting and braking each roll, a pair of web cut-off knives carried by said reel and positioned diametrically opposite each other and at substantially right angles with said rolls, a pair of speed-up drive belt mechanisms adapted for rotating the new roll in either direction until its peripheral speed is substantially the same as the unwinding web speed, a pressure roll positioned on each side of the unwinding web, horizontally movable means for carrying said pressure rolls for movement from a retracted position where the pressure rolls provide clearance for the revolving of a new roll carried by said reel to an advanced position for providing pressure contact selectively between either side of the unwinding web and the outside web surface of the new roll supported by said reel according to whichever side of the web from the new roll is desired to be positioned on top, power operated means for moving each said pressure roll between said retracted and advanced positions, and means for actuating one of said severing mechanisms in timed relationship with the contact between the new roll and the unwinding web to effect cut-off and splicing of the web with the end of the new roll.

9. An improved apparatus for continuously unwinding and splicing web materials wherein either side of the web from an unwinding roll can be spliced selectively to the lead end of the web from the new roll regardless of the extent of web material remaining on the unwinding roll, comprising a reel adapted to support at least two rolls of web materials, means for rotatably supporting said reel so that each roll can be revolved about the axis of said reel, means on said reel for rotatably supporting each roll, at least two web severing mechanisms carried by said reel and adapted to move about the reel axis with said rolls, speed-up means for rotating the new roll until its peripheral speed is substantially the same as the unwinding web speed, a pressure roll positioned on each side of the unwinding web, a pair of pivotally mounted arms supporting said pressure rolls for slight vertical movement, means for selectively positioning said rolls so that one of said rolls is closer to the axis of said reel to provide pressure contact selectively between either side of the unwinding web and the outside web surface of the new roll supported by said reel according to whichever side of the web from the new roll is desired to be positioned on top, means connected to said arms for cushioning the vertical movement of said rolls during contact with the new roll of material, and means for actuating one of said severing mechanisms in timed relationship with the pressure contact between the new roll and the unwinding web to effect cut-off and splicing of the web with the end of the new roll.

10. An improved apparatus for continuously unwinding and splicing web materials wherein either side of the web from an unwinding roll can be spliced selectively to the lead end of the web from the new roll regardless of the extent of web material remaining on the unwinding roll, comprising a reel adapted to support at least two rolls of web materials, means for rotatably supporting said reel so that each roll can be revolved about the axis of said reel, means on said reel for rotatably supporting each roll, at least two web severing mechanisms carried by said reel and adapted to move about the reel axis with said rolls, speed-up means for rotating the new roll until its peripheral speed is substantially the same as the unwinding web speed, a pressure roll positioned on each side of the unwinding web, a guide roll positioned adjacent one of said pressure rolls to provide a partial wrap therearound, means mounting said pressure rolls and guide roll for movement as a unit to a retracted position to provide clearance for moving a new roll of web material when said reel is rotated, means for selectively positioning each of said pressure rolls in the path of movement of a new roll, means for quickly moving either of said pressure rolls into pressure engagement with the new roll of web material to provide pressure contact selectively between either side of the unwinding web and the outside web surface of the new roll supported by said reel according to whichever side of the web from the new roll is desired to be positioned on top, and means for actuating one of said severing mechanisms in timed relationship with the contact between the new roll and the unwinding web to effect cut-off and splicing of the web with the end of the new roll.

*11. An improved apparatus for splicing either side of a web from an unwinding roll to the lead end of a web from a new roll regardless of the extent of web material remaining on the unwinding roll, comprising a reel including means for rotatably supporting each roll, means for rotatably supporting said reel so that the rolls can be revolved about the axis of said reel, speed-up means for rotating the new roll until its peripheral speed is substantially the same as the unwinding web speed, a pressure roll positioned on each side of the path of the unwinding web, means supporting each of said pressure rolls for movement between a retracted position providing for unrestricted movement of the new roll carried by said reel and an extended position selectively locating each said pressure roll in the path of movement of the new roll, and pressure cylinder means for moving each said pressure roll for pressing either side of the unwinding web against the outer surface of the new roll.*

*12. An improved apparatus for use in splicing either side of a web from an unwinding roll to the lead end of a web from a new roll regardless of the extent of web material remaining on the unwinding roll, comprising a reel having means for rotatably supporting each roll, means for rotatably supporting said reel so that the rolls can be revolved about the axis of said reel, speed-up means for rotating the new roll until its peripheral speed is substantially the same as the unwinding web speed, a pair of parallel spaced arms extending generally horizontally, a pressure roll mounted on said arms, pivot means supporting said arms for limited movement from the horizontal causing*

*generally vertical movement of said pressure roll, means for moving said pivot means substantially horizontally to cause said arms to effect corresponding movement of said pressure roll between a retracted position providing for unrestricted movement of the new roll carried by said reel and an extended position locating said pressure roll in the path of movement of such new roll, and pressure cylinder means connected to said arms for effecting controlled limited movement of said pressure roll with respect to such new roll to press the unwinding web against the outer surface of such new roll.*

*13. Apparatus as defined in claim 12 including a guide roll mounted on said arms and positioned adjacent said pressure roll to provide a partial wrap of the web around said pressure roll.*

*14. Apparatus as defined in claim 12 wherein said means for moving said pivot means include horizontally extending tracks supporting said pivot means, and power operated screw jacks for moving said pivot means on said tracks.*

References Cited

The following references, cited by the Examiner, are of record in the patented file of this patent or the original patent.

UNITED STATES PATENTS 3,106,360 10/1963 Kohler ---------- 242—58.3

LEONARD D. CHRISTIAN, *Primary Examiner.*